US011250366B2

(12) United States Patent
Dering et al.

(10) Patent No.: US 11,250,366 B2
(45) Date of Patent: *Feb. 15, 2022

(54) DYNAMIC PREDICTION OF RISK LEVELS FOR MANUFACTURING OPERATIONS THROUGH LEADING RISK INDICATORS: DYNAMIC RISK SLOPING TREND METHOD AND SYSTEM

(71) Applicant: Near-Miss Management LLC, Philadelphia, PA (US)

(72) Inventors: Matthew L. Dering, Philadelphia, PA (US); Ankur Pariyani, Philadelphia, PA (US); Ulku G. Oktem, Philadelphia, PA (US); Daniel Shumway, Philadelphia, PA (US); Brett Emaus, Philadelphia, PA (US); Steven DeLaurentis, Philadelphia, PA (US)

(73) Assignee: Near-Miss Management LLC, Philadelphia, PA (US)

( * ) Notice: Subject to any disclaimer, the term of this patent is extended or adjusted under 35 U.S.C. 154(b) by 46 days.

This patent is subject to a terminal disclaimer.

(21) Appl. No.: 16/894,965

(22) Filed: Jun. 8, 2020

(65) Prior Publication Data
US 2020/0302354 A1 Sep. 24, 2020

Related U.S. Application Data

(63) Continuation-in-part of application No. 16/356,580, filed on Mar. 18, 2019, now Pat. No. 10,705,516, (Continued)

(51) Int. Cl.
*G08B 23/00* (2006.01)
*G06Q 10/06* (2012.01)
(Continued)

(52) U.S. Cl.
CPC ......... *G06Q 10/0635* (2013.01); *G05B 17/02* (2013.01); *G06N 7/005* (2013.01);
(Continued)

(58) Field of Classification Search
CPC .... G06Q 10/0635; G06Q 50/04; G06Q 10/10; G06T 11/206; G06N 7/005; G05B 17/02; Y02P 90/30
(Continued)

(56) References Cited

U.S. PATENT DOCUMENTS 7,526,405 B2 * 4/2009 Miller .................. G05B 23/024
382/144
7,908,660 B2 * 3/2011 Bahl ....................... H04L 41/28
726/25

(Continued)

*Primary Examiner* — Anh V La
(74) *Attorney, Agent, or Firm* — Stradley Ronon Stevens & Young LLP

(57) ABSTRACT

The invention provides a dynamic risk analyzer (DRA) that periodically assesses real-time or historic process data, or both, associated with an operations site, such as a manufacturing, production, or processing facility, including a plant's operations, and identifies hidden near-misses of such operation, when in real time the process data appears otherwise normal. DRA assesses the process data in a manner that enables operating personnel including management at a facility to have a comprehensive understanding of the risk status and changes in both alarm and non-alarm based process variables. The hidden process near-miss data may be analyzed alone or in combination with other process data and/or data resulting from prior near-miss situations to permit strategic action to be taken to reduce or avert the occurrence of adverse incidents or catastrophic failure of a facility operation.

13 Claims, 8 Drawing Sheets

Related U.S. Application Data which is a continuation-in-part of application No. 15/012,109, filed on Feb. 1, 2016, now Pat. No. 10,268,962, which is a continuation-in-part of application No. 14/511,729, filed on Oct. 10, 2014, now Pat. No. 9,495,863.

(60) Provisional application No. 62/109,865, filed on Jan. 30, 2015.

(51) Int. Cl.
*G06Q 50/04* (2012.01)
*G06T 11/20* (2006.01)
*G06N 7/00* (2006.01)
*G05B 17/02* (2006.01)
*G06Q 10/10* (2012.01)

(52) U.S. Cl.
CPC ............. *G06Q 10/10* (2013.01); *G06Q 50/04* (2013.01); *G06T 11/206* (2013.01)

(58) Field of Classification Search
USPC ........ 340/501, 540, 999; 702/179, 182, 183; 345/440
See application file for complete search history.

(56) References Cited

U.S. PATENT DOCUMENTS

| | | | |
|---|---|---|---|
| 10,268,962 B2* | 4/2019 | Pariyani | G05B 23/024 |
| 2003/0065409 A1* | 4/2003 | Raeth | G05B 23/0254 |
| | | | 700/31 |
| 2014/0344007 A1* | 11/2014 | Shende | G06Q 10/0635 |
| | | | 705/7.27 |

* cited by examiner

DYNAMIC PREDICTION OF RISK LEVELS FOR MANUFACTURING OPERATIONS THROUGH LEADING RISK INDICATORS: DYNAMIC RISK SLOPING TREND METHOD AND SYSTEM

CROSS-REFERENCE TO RELATED APPLICATION

This application is a continuation-in-part of and claims the priority and benefit of U.S. patent application Ser. No. 16/356,580, entitled "Dynamic Prediction Of Risk Levels For Manufacturing Operations Through Leading Risk Indicators: Dynamic Risk Fault Tree Method And System", filed Mar. 18, 2019, which is a continuation-in-part of and claims the priority and benefit of U.S. Pat. No. 10,268,962, entitled "Dynamic Prediction of Risk Levels for Manufacturing Operations through Leading Risk Indicators: Dynamic Risk Analyzer Engine", filed Feb. 1, 2016 which is a continuation-in-part of and claims the priority and benefit of U.S. Pat. No. 9,495,863, entitled "Dynamic Prediction of Risk Levels for Manufacturing Operations through Leading Risk Indicators: Alarm-based Intelligence and Insights, filed Oct. 10, 2014. This application also claims the priority and benefit of U.S. Provisional Patent Application Ser. No. 62/109,865, entitled "Dynamic Prediction of Risk Levels for Manufacturing Operations through Leading Risk Indicators: Dynamic Risk Analyzer Engine," filed on Jan. 30, 2015. The entireties of each application are incorporated herein by reference in their entireties.

FIELD OF THE INVENTION

The dynamic risk analyzer (DRA) of the present invention periodically assesses real-time or historic process data, or both, associated with an operations site, such as a manufacturing, production, or processing facility, including a plant's operations, and identifies hidden near-misses of such operation, when in real time the process data appears otherwise normal. The DRA assesses the process data in a manner that enables operating personnel including management at a facility to have a comprehensive understanding of the risk status and changes in both alarm and non-alarm based process variables. The hidden process near-miss data may be analyzed alone or in combination with other process data and/or data resulting from prior near-miss situations to permit users to not only be aware of issues that may occur later, but also be informed of how quickly a given issue may occur. As a result of this information, strategic action may be taken to: (a) reduce or avert the occurrence of adverse incidents or catastrophic failure of a facility operation; or (b) delay an unnecessary shutdown.

BACKGROUND OF THE INVENTION

Every low-probability, high-consequence adverse incident or catastrophic operational failure at any production or processing facility, such as a chemical plant, fluid-catalytic-cracking units (FCCU) at a petroleum refinery, nuclear energy production plant, or even a biological facility or waste management facility, is preceded by many high-probability, low-consequence events, which may or may not be recognized by alarms or are considered near-misses (Pariyani et al., Ind. Eng. Chem. Res. 49:8062-8079 (2010a); Pariyani et al., 20th European Symposium on Computer Aided Process Engineering (ESCAPE) 28:175-180 (2010b)). Some of these events remain hidden in the background of normal operating conditions. An ideal risk management system at the plant will account for the near-misses, especially those that are hidden, and develop indicators to notify the operators in advance of undesirable incidents that are likely to happen. In particular, such knowledge becomes highly desirable for unmanned plants/facilities.

The public has been harmed by industrial accidents, adverse events, and/or catastrophic failures that could have been avoided with a DRA system. Indeed, the US government chemical safety board web site (www.csb.gov) is inundated with reports of accidents that took place in the chemical manufacturing facilities in the recent years that cost several lives, as well as property damage. The recurring themes in the outcome of analysis of these accidents are a) the lack of preventive maintenance, and b) the lack of attention to process near-misses. Moreover, every year billions of dollars are lost in the manufacturing industry due to "trips" (unexpected shutdowns due to malfunction of the equipment and/or control systems) at operational plants and facilities. For instance, there have been $6 billion/year losses recorded by US refineries from unexpected shutdowns and associated incidents of crude and fluidized catalytic cracking (FCC) units.

An additional condition, which is frequently observed in most manufacturing or processing facilities, is silencing (muting) the alarms that are considered to be nuisance. These are alarms that are activated so often that they are considered to be of such little significance by the operators, that they are regarded as unimportant disturbances resulting from normal operations, so they are turned off or ignored like fire drills in office buildings. But such actions negate the value of the alarm system. For example, at an offshore refinery facility visited in 2011 by the inventors, most of the "low priority" alarms had been silenced. In fact, one of the reasons that the BP off shore accident in Gulf of Mexico in 2010 (where 11 people died and 17 were injured) was not identified in its early stages was because an alarm had been silenced after it had been going off in the middle of the night and awaking the workers.

Most safety activities are reactive and not proactive, and as a result many organizations wait for losses to occur before taking preventative steps to prevent a recurrence. Near miss incidents often precede loss producing events but are either hidden within process operations and related data or are largely ignored because no injury, damage, or loss actually occurred. Thus, many opportunities to prevent an accident or adverse incident are lost. However, recognizing and reporting near miss incidents, particularly measurable near misses, such as, for example, by alarms in an alarm-monitored plant/facility or by comparative data, can make a major difference to the safety of workers within organizations, and often to the public at large, e.g., in the case of a nuclear-powered facility wherein in a systems failure poses a significantly high amount of risk. History has shown repeatedly that most loss producing events (accidents) were preceded by warnings or near-miss accidents.

Fault tree analysis (FTA) is a logical graphic method used to evaluate the reliability of complex engineering systems from qualitative and quantitative perspectives. Fault trees provide a graphical representation of combinations of component failures leading to an undesired system failure. However, in many situations, the behavior of components in a complex system and their interactions, such as failure priority, sequentially dependent failures, functional dependent failures, and dynamic redundancy management, cannot be adequately addressed by traditional fault trees due to their limited modeling capacity.

A major disadvantage of the traditional FTA is its inability to capture sequence dependencies in the system while still allowing an analytic solution. Dynamic gates may be employed to address this disadvantage. There are four major types of dynamic gates: (1) priority-AND gates (PAND gates); (2) functional dependency gates (FDEP gates); (3) sequence enforcing gates (SEQ gates); and (4) spare gates.

PAND gates have two inputs, A and B, both of which may be basic events or the output of other logic gates. The output of this gate is true if both inputs have occurred and A occurred before B.

FDEP gates include a trigger input (either a basic event or an output of another gate) and one or more dependent events. The dependent events rely upon the trigger event. When the trigger event occurs, the dependent basic events follow, and the output becomes true.

SEQ gates do not open unless the inputs fail in a particular order. They are not true if the failure sequence occurs in a different order than that specified. The difference between SEQ gates and PAND gates is SEQ gates allow events to occur only in a pre-specified order and states that a different failure sequence is impossible. PAND gates do not impose such a strong assumption: they simply detect the failure order, and a failure is triggered upon the match with the order.

Spare gates often include one principal component that can be substituted by one or more backups that have the same function as the principal component. If the primary unit fails, the first alternate component begins to function. The output does not become true until all the replacements fail.

Simply observing known parameters may not be enough to evaluate the reliability of complex engineering systems from qualitative and quantitative perspectives. Subtle trends should be considered. However, such subtle linear trends may be deceiving. Indeed, what may appear to be a subtle trend over a designated time period may be nothing more than statistical noise (i.e., a phantom trend). Separating valid trends from phantom trends is difficult or impossible without a modeling approach that can account for the complex relationships among the various types of data. Especially when some of the parameters are, as here, unobservable (e.g., near misses).

Thus, there is a need, not met until the present invention, for a "dynamic risk analyzer" (DRA) system that can tell the difference between valid trends as opposed to phantom trends via periodically analyzing real time and historic data. Such an ability to differentiate between trends would permit the system to provide more accurate: (a) assessments of operational risks, and (b) identifications of near misses of alarm and non-alarm based process variables, which are hidden as normal operating conditions. Based on such information the system could send alert signals and/or reports to identify the hidden risk thereby reducing or preventing adverse incidents or failures.

SUMMARY

The DRA may incorporate a dynamic risk slope trending system for analyzing risk levels for manufacturing operations. The components of a DRST system work in concert to automatically process a large number (often 1000 or more) tags on a scheduled basis and alert DRA system users to the presence of trends. In doing so, the users can be aware of not only issues that may occur later, but also be informed of how quickly a given tag may reach a critical value (e.g. a coating which is eroding, and once it reaches 3 mm, it will require maintenance).

The system includes a server that receives automatically measured process data from a real-time data source and/or a historical archive data source and long-term process data for a period preceding the measured process data. A processor analyzes the data. Specifically the values of parameters P and/or groups G of the parameters P of the measured process data at time interval T and compares the measured process data to the long-term process data to determine the location of a best fit line of the measured process data and the long term process data, wherein the best fit line is automatically updated over time to identify operational risk and/or near-miss risk that would otherwise be unknown or concealed in parameters P. Based on the slope and/or strength of the best fit line, the system identifies operational risk and/or near-miss risk that would otherwise be unknown or concealed in parameters P. This identified operational risk and/or near-miss risk is used for strategic corrective action. A display presents the information the operational risk and/or near-miss risk in a graphic that visually depicts the long term process data and the measured process data within a specified time period along with the best fit line over top of the measured process data and the long term process data. Furthermore, this system operates continuously.

In certain embodiments, the system may determine the best fit line using a Bayesian model-based filter, such as a Kalman filter, which accounts for the measured process data and the long-term process data. The best fit line may be linear or non-linear. The process data may be either an analog signal or a two-state signal. Furthermore, the system may not communicate the process data outside the manufacturing operation and the system may operate autonomously.

A method for analyzing risk levels in a manufacturing operation. The method includes collecting: (1) measured process data, comprising: data automatically collected by a data collection component, located within the manufacturing operation, in either: (a) real-time or (b) from an archive server or both; and (2) long-term process data for a period preceding the collecting measured data. The data is used to identify risk and/or near-miss risk of the manufacturing operation that would otherwise be unknown or concealed in parameters P and/or groups G of the parameters P of process data by comparing the measured process data to the long-term process data to determine the location of a best fit line of the measured process data and the long term process data, wherein the best fit line is automatically updated over time to identify operational risk and/or near-miss risk that would otherwise be unknown or concealed in parameters P. Displaying the risk or near-miss risk in a graphic that visually depicts the long term process data and the measured process data within a specified time period along with the best fit line over top of the measured process data and the long term process data. Furthermore, the method is performed continuously and autonomously.

A display system for risk indicators for a manufacturing operation is also disclosed. The display requires the identification of risk and/or near-miss risk of the manufacturing operation that would otherwise be unknown or concealed in parameters P and/or groups G of the parameters P of measured process data, in real-time, periodically, and/or historically. The measured process data is obtained by using a data collection component located within the manufacturing operation. Parameter P of the risk and/or near-miss risk date is compared to long-term process data to determine the location of a best fit line of the measured process data and the long term process data, wherein the best fit line is automatically updated over time to identify operational risk and/or near-miss risk that would otherwise be unknown or concealed in parameters P. A display depicts the risk or near-miss risk in a graphic that visually depicts the long term process data and the measured process data within a specified time period along with the best fit line over top of the measured process data and the long term process data.

BRIEF DESCRIPTION OF THE FIGURES

The description discloses the invention that is illustrated with reference to the accompanying figures to advise one of ordinary skill in the art of the characteristics and benefits of the invention. In the various views of the figures, like reference characters designate like or similar parts, whereby.

DESCRIPTION OF THE INVENTION

Figure 1:
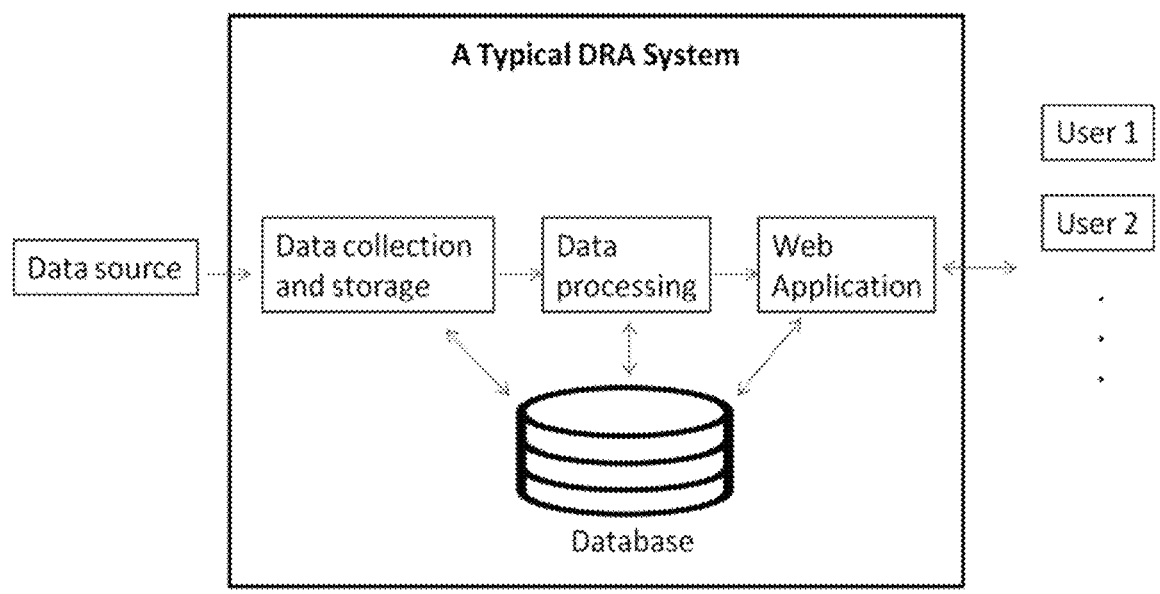
FIG. 1 shows a DRA system of the present invention.

In general, and unless otherwise indicated, singular elements may be in plural and vice versa with no loss of generality.

Definitions

As used herein, each of the following terms has the meaning associated with it in this application.

The phrase "process data" is used to refer to data resulting from real-time measurements of both alarm and non-alarm-based process variables associated with a plant/facility including temperature, pressure, and the like. More specifically, "process data" is the collection of all or at least some of the values of process parameters that are measured, recorded, and reported by the distributed control system (DCS) for a process or plant, wherein a hierarchy of controllers is connected by communications networks for command and monitoring of control elements distributed throughout the system, or any other device that automatically measures the value of one or more variables and reports the data either in-real time or periodically, or both. For example, process data can include, but not be limited to, values including temperature measured in a reactor, at an inlet stream or an outlet stream, pressure of a reactor, flow rate of a liquid or gas going into or out of a reactor, liquid level in a reactor or a tank, and the like. In large industrial operations, there are hundreds of process variables that can be measured and reported. An industrial manufacturing operation centered around a reactor would have several parameters that are associated with that "reactor unit" (reactor and its associated peripheral equipment). Also, there are, for example, several parameters associated with a liquid flowing into a reactor including its temperature, pressure, viscosity, etc. Together the values of all these parameters comprise "process data."

The phrase "real time" is used in its plain and ordinary meaning.

The phrase "distributed control system" or alternatively "DCS" is used to refer to a system of processors used as controllers that implement proprietary interconnections, control strategies, and standard communications protocol for communication. Input and output modules form component parts of the DCS. The processor receives information from input modules and sends information to output modules. Linked into the wired and/or wireless network, the input modules receive information from input instruments in the process or field and the output modules transmit instructions to the output instruments in the field. The inputs and outputs can be, for example, either analog signal which are continuously changing or discrete signals which are 2 state either on or off. Computer buses or electrical buses connect the processor and modules through multiplexer or demultiplexers. Buses also connect the distributed controllers with the central controller and finally to the Human-machine interface (HMI) or control consoles. The elements of a DCS may connect directly to physical equipment such as switches, pumps and valves and to Human Machine Interface (HMI) via SCADA. The differences between a DCS and SCADA is often subtle, especially with advances in technology allowing the functionality of each to overlap.

The phrase "near-miss" is used herein to refer to something narrowly avoided; a lucky escape. More specifically, a "near miss" for safety purposes is an unplanned event that did not result in actual injury, illness, or damage—but had the potential to do so, especially if left unaddressed.

The term "group" is used to refer to a collection of parameters that typically share one or more common characteristic(s).

The phrase "hidden process near-miss" is used to refer to a near-miss event or a series of events (often not obvious to the plant/facility operators through naked eye) that can be identified within process data of an operation. These events can be treated as precursors to accidents, hence, can be utilized by plant/facility operators as well as management to improve the system performance and prevent potential accidents.

The phrase "risk results" is used to refer to information on hidden near misses that indicate events or variables or their groups that exhibit risky or abnormal behavior.

The phrase "open platform communication" or alternatively "OPC" is used to refer to interoperability standards for reliable and secure exchange of data, between industrial hardware devices in the automation industry, developed by third-party vendors and solution providers. OPC standards define protocols for accessing real-time data, alarms and events, historical data and other applications. The OPC Foundation (opcfoundation.org) is responsible for the development and maintenance of the standards.

The phrase "OPC server" is used to refer to a commercially available server that is configured and functions in accordance with OPC standards and protocols and allows easy access to process data and alarms without the need to write vendor-specific programs.

The term "processor" is used to refer to a processor or processing unit, multiple processors, or multiple processing units, or other suitably configured computing element.

Dynamic Risk Analyzer

This description of the invention is intended to be read in connection with the accompanying figures depicting embodiments of the invention.

Figure 2:
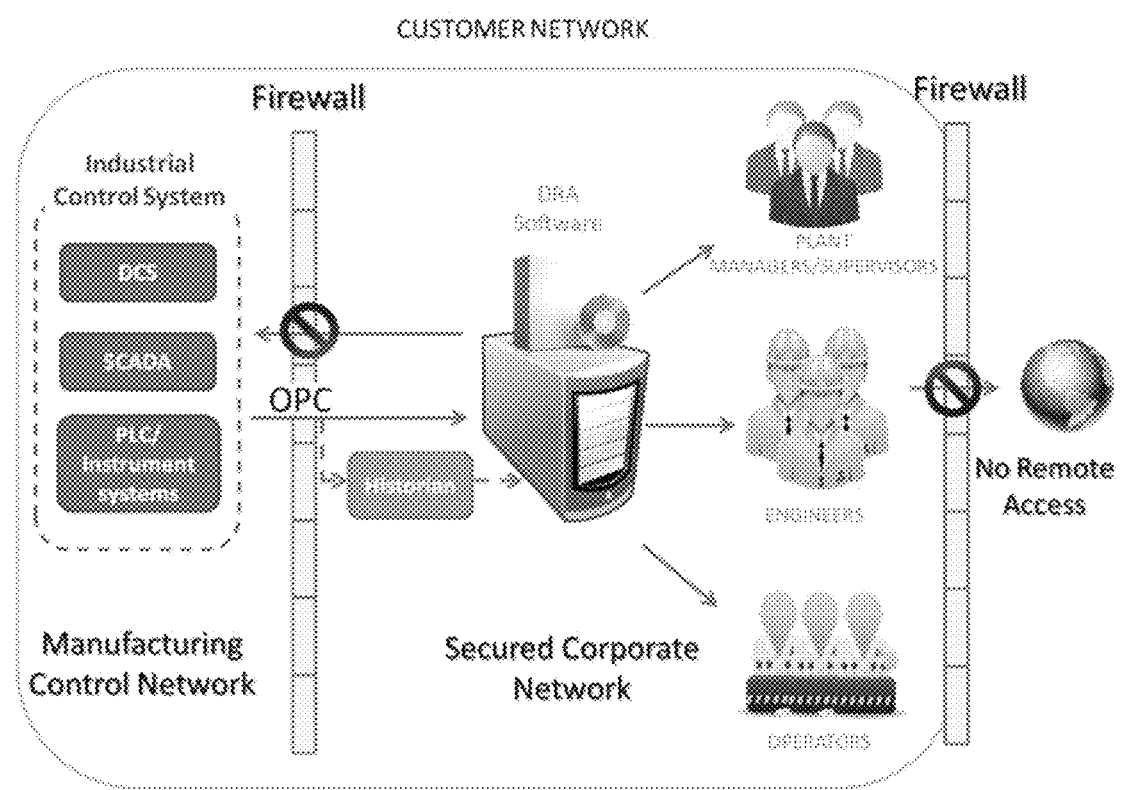
FIG. 2 shows a DRA system within a secured network with no remote access where connectivity with the OPC server allows the DRA system to obtain continuous process data, as it gets measured and channeled out, without requiring any direct communication with the industrial controls system (such as DCS, SCADA, or PLC devices).

Referring to FIGS. 1-2, the dynamic risk analyzer (DRA) comprises a system for analyzing process data periodically (at a specific calculation interval) to identify risk results in connection with risk analysis processes for an operations site. The DRA system is useful for analyzing the process risk levels of an operations site, e.g., a manufacturing, production, or processing facility, on a periodic basis (e.g., minute, hourly, daily, etc.) in real-time or historically, and identifies hidden process near-misses. The DRA system is designed specifically to address the needs of plant managers, engineers, and other operating personnel, who review risk status on a periodic basis and take strategic actions as needed.

An overview of the DRA system is shown generally in FIG. 1. The DRA system is a computer-based system that includes (1) a data collection component, to connect to data source such as OPC server or historian, etc.; (2) a computer-readable data storage medium consisting of a relational database and a key-value storage (NoSQL) solution; (3) a data processor component, consisting of risk analysis methods and a processor such as a personal computer, a laptop computer, a workstation, a tablet computer, a smart-phone, and/or portable electronic device; and (4) a data presentation platform, such as a website, e.g., Internet or Intranet. The DRA system includes an integrated wired and/or wireless communication network that links all of the components of the system.

The collection component functions by receiving process data from a data source, such as an OPC server, historian, etc., in real-time or periodically and storing the process data in the system's computer readable data storage medium. DRA receives "process data" from an OPC server or Historian at scheduled intervals (every second/minute/hour or other). The data from an OPC server can be stored in an archival server and later accessed for online/offline analyses. An archival server can be a historian system. Commercial historian systems are available in the market (see http://en.wikipedia.org/wiki/Operational_historian), which have the capability to store large volumes of data, anywhere from a few hundred data points per second to hundreds of thousands of data points per second. In addition, the archival server permits end-users to browse and retrieve the historical data for several years.

The computer-readable data storage medium comprises a database, such as a relational database, and a key-value storage (NoSQL) solution. The computer readable storage medium functions by storing relevant process data and risk results and subsequently making stored data available for access by other components of the DRA system. Standard commercial or open-source packages can be used as the data storage medium. For example, MySQL, Microsoft SQL Server, and Oracle are suitable relational database solutions. Redis, MongoDB, or Oracle NoSQL can be used as key-value storage. The combination of relational and NoSQL databases allows DRA system to handle large volumes of data reliably. Alternatively, the data storage medium can include, but not be limited to, volatile memory, non-volatile memory, magnetic and optical storage devices such as disk drives, magnetic tape, CDs (compact discs), DVDs (digital versatile discs or digital video discs), removable storage, or other media capable of storing code and/or data, now known or later developed. All the process data and risk results can reside on the computer-readable data storage medium related to a company's secured server and network that is in communication with the DRA system and are not communicated to the external world. The DRA system is designed to continue operation perpetually, without any user intervention.

The data processor functions by analyzing collected and/or stored data to identify hidden near-miss risks. The data processor may be any electronic device cable of processing, receiving, and/or transmitting instructions. For example, the processor may be a microprocessor or a microcomputer. The data processing component begins calculations starting at every T intervals (where the value of T is between 1-minute to 1-month, with the typical value being 1-day)—based on the methods, such as DRA100, DRA200, DRA300, LI100, and LI200, among others, as described in U.S. Pat. No. 8,884,759, the entirety of which is incorporated herein by reference, to obtain the risk results that are used to alter or correct a problem in an operation. Depending upon the number of variables and/or groups being analyzed, length of time interval 'T', and server speed, the data processing can take anywhere from a few seconds to several minutes or hours or days.

The data presentation platform, such as an Internet or Intranet website, functions by visually presenting risk results identified by the data processor on a computer display. The data presentation component comprises a web application that serves different web pages (dashboards) within DRA to allow the user to browse the risk results. The latest risk results are added once the data processing is complete. There are several system-based services that run continuously to support user (client) interaction with the DRA system. In an embodiment, the data presentation component can include a petal chart, which comprises a new method of presenting variation of risk values with time.

The petal chart is introduced to show variation of a parameter P over discrete time periods, which can be any measurable time period, such as minutes, hours, days, weeks, months, years, etc. The different values of the parameter P are graphically displayed as petals next to each other relative to the discrete time period. The total number of petals in a given chart can range anywhere from 1 to 360, which a value being 7, for example. The length of a given petal indicates the value of the parameter for a given time value. If we assume that $P \in [0, R]$, where R is a positive real number, then the radii of the outer and inner semicircles are equal to $R+R_0$, where $R_0$ is a real number greater than zero and can be chosen by an analyst. The maximum value of P is shown by a petal whose edge touches the outer circle of the Petal Chart. The inclusion of an outer circle depicted on a petal chart is optional. Also, in reference to FIG. 3, the angle spread of the petal chart around the center of the petal chart is 180 degrees which can be a typical value. However, petal charts can have an angle spread equal to 90° around the center of the petal chart, or alternatively an angle value of between 30° to 180° can also be plotted on a petal chart.

Figure 3:
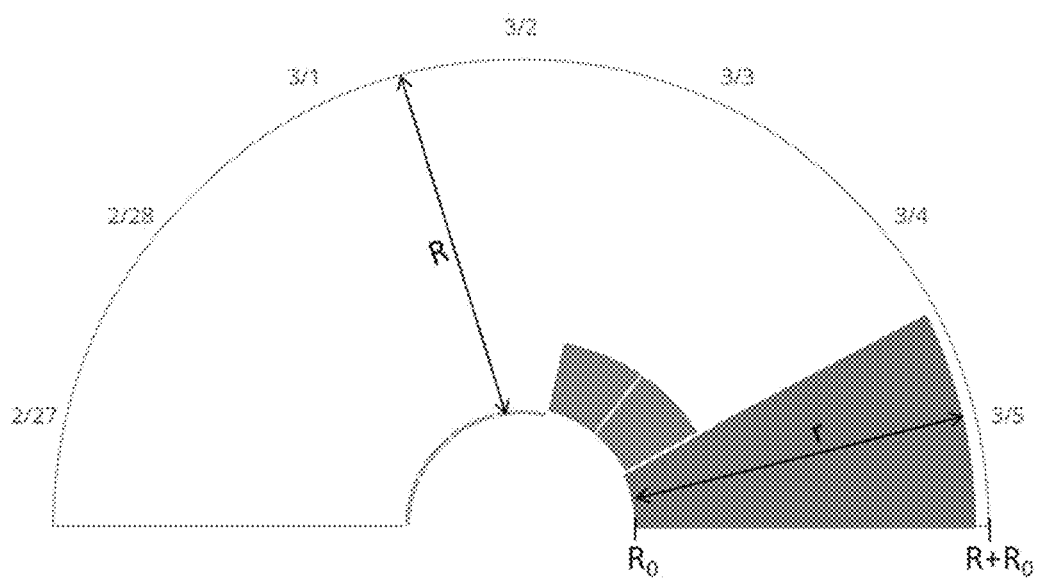
FIG. 3 shows a petal chart for parameter P indicating its 7 values over 7 time periods (days) where the value of P for March-5 is equal to r, which is indicated by the petal with length r.

For example, FIG. 3 shows a petal chart for parameter P indicating 7 values for parameter P calculated for 7 time periods, which in this case each time period equals one day. Note that the value of parameter P for March 5 (3/5) is equal to r, which is indicated by the petal with length r. Using this concept, the calculated metrics identified in U.S. Pat. No. 8,884,759 such as the dynamic risk index, the compounded risk score, the number of abnormal events, the time segment values, etc., can be plotted with a petal chart.

Figure 4A:
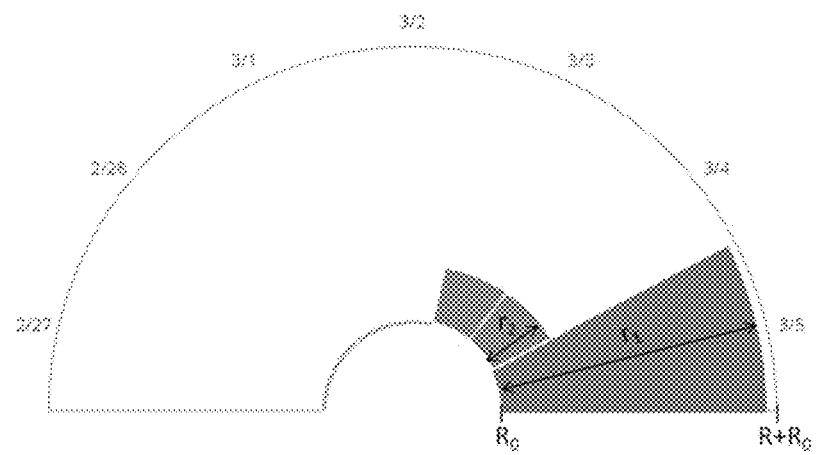
FIGS. 4A, 4B, 4C show a presentation of a variation of parameter P over 7 consecutive time intervals on the petal chart (FIG. 4A) having a comparative distinct visual advantage over a bar chart (FIG. 4B), and line chart (FIG. 4C) showing.
Figure 4B:
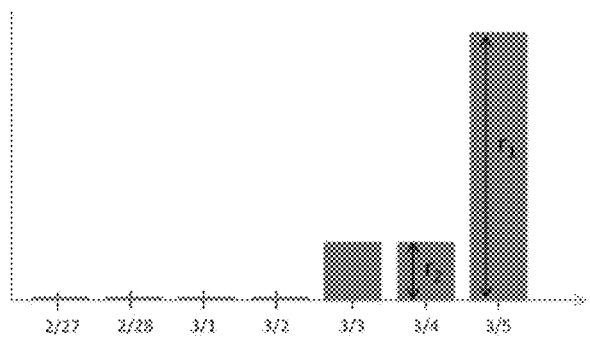
Figure 4C:
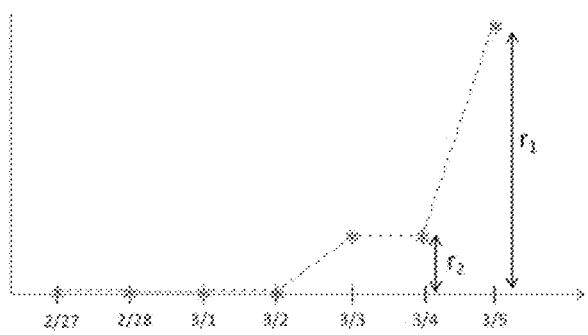
Figure 5:
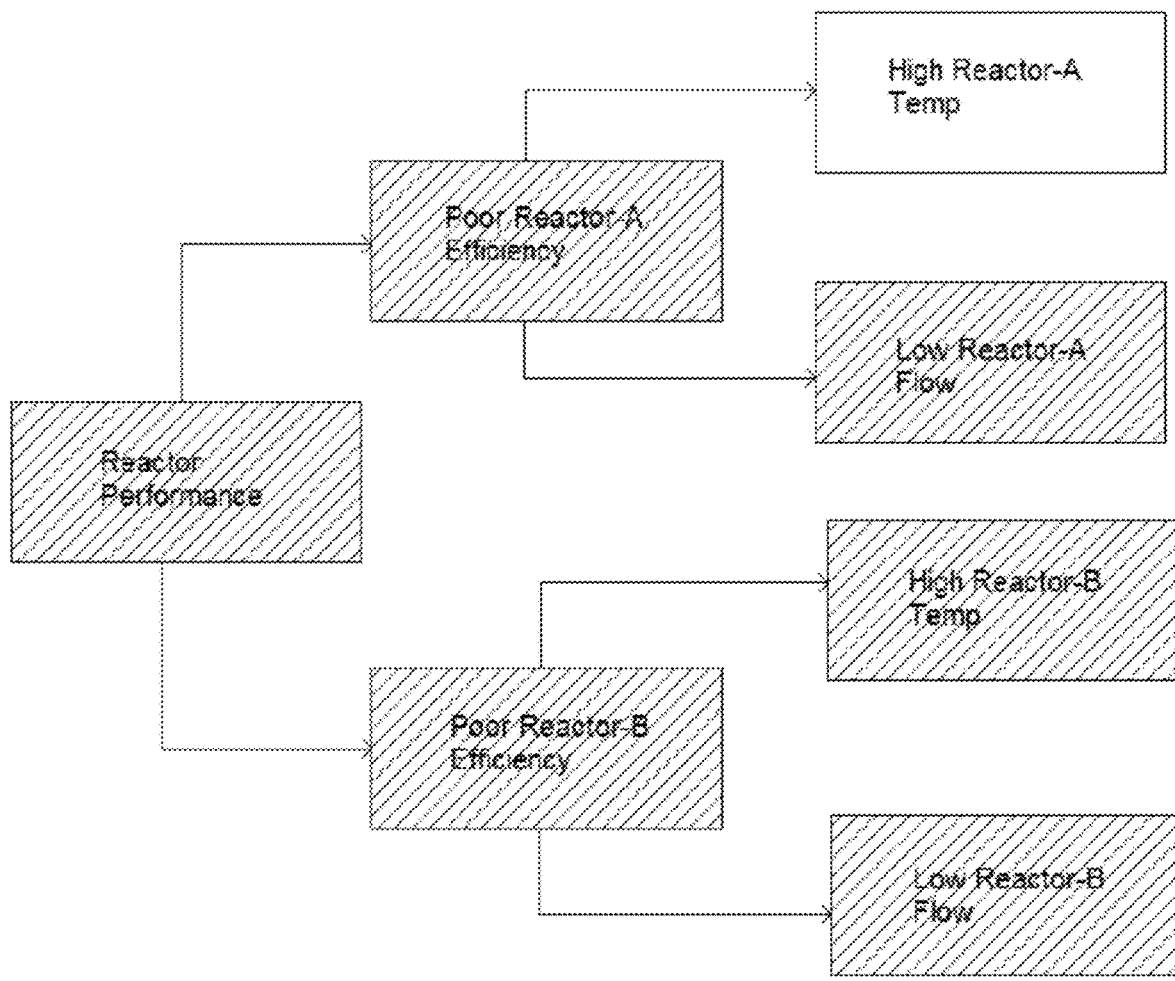
FIG. 5 shows an embodiment of a dynamic fault tree at a single designated time period.
Figure 6:
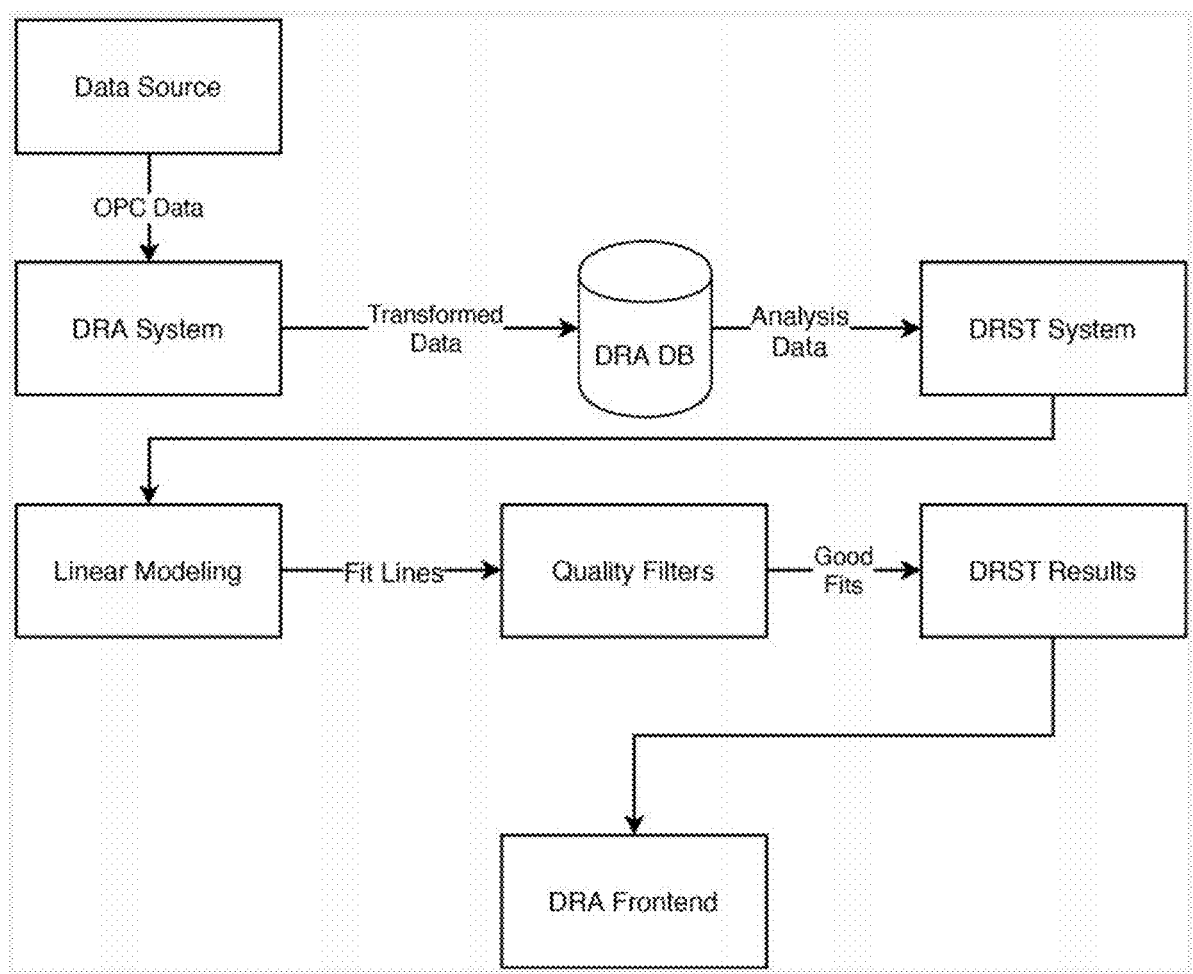
FIG. 6 shows a flowchart of one embodiment of the components of the dynamic risk sloping trend system.

Referring now to FIGS. 4a-4c, the petal chart has a distinct visual advantage over bar charts and line charts. The variation of parameter P for 7 consecutive time intervals, wherein each time interval is a day, is plotted using a petal chart (FIG. 4a), a bar chart (FIG. 4b), and a line chart (FIG. 4c). In FIG. 4a, the area displayed by each petal, e.g., for March 5 (3/5), is equal to $\theta(r_1^2+2r_1R_0)$, wherein $\theta$ is the angle spread for the petal, with origin at the center point of the petal chart. Thus, the ratio of areas of petals for March 5 (3/5) and March 4 (3/4) is equal to $(r_1^2+2r_1R_0)/(r_2^2+2r_2R_0)$. For the special case when $R_0 \ll r_1, r_2$, this ratio is equal to $r_1^2/r_2^2$. In comparison, the bar chart shown in FIG. 4b shows the ratio of areas of bars for March 5 (3/5) and March 4 (3/4) with heights equal to $r_1$ and $r_2$, is equal to $r_1/r_2$. Similarly, the line chart shown in FIG. 4c shows the ratio of heights of data points for March 5 (3/5) and March 4 (3/4) is equal to $r_1/r_2$. This means that the relative visual impact of the value of parameter P for March 5 (3/5) with respect to that of March 4 (3/4) is more visually significant in the petal chart, when compared to the presentation of the same values for parameter P in a bar chart and a line chart. Hence, the petal chart highlights the relative difference between data points better than that depicted with traditional bar charts and line charts. The petal chart is especially beneficial for operations sites, where the end-users are busy engineers and operators who benefit from quickly viewing the relative difference between consecutive data points.

The DRA system integrated into an operations environment is shown in FIG. 2. Connectivity with the OPC server allows DRA system to obtain continuous process data, as it gets measured and channeled out, without requiring any direct communication with the industrial controls system, such as DCS, SCADA, or PLC devices. Alternatively, the DRA system can extract the process data from the Historian in real-time or at periodic intervals, e.g., every second, minute, hour, or any other time interval. Once the process data begins to arrive, the DRA system calculates "risk results" at every T interval, where the value of T can be between 1-minute to 1-month or other time parameter, with the value being 1-day in an embodiment.

The DRA can automatically identify hidden process near-misses that can potentially lead to accidents having a major impact on safety, operability, quality, and/or business.

The methods to obtain process data are defined in U.S. Pat. No. 8,884,759, the entirety of which is incorporated herein by reference, and more specifically can include methods such as DRA100, DRA200, DRA300, LI100, and LI200, among others. The DRA functions to analyze process data to identify hidden process near-misses and to report, record, and use the identified information, e.g., risk results, for system improvement purposes.

Often, in industrial operations, the number of process parameters is large. To facilitate the review and analysis of their risk results, the DRA system allows the users to aggregate the process parameters in "groups" which enables the busy operating personnel to obtain a quick high-level view of developing risks in the operations. The parameters in a group may or may not be causally related to each other. For example, in a typical plant operation, groups such as reactors, vessels, pumps, condensers, etc., can be defined.

The risk results are available via a web interface to operating team members, also known as end-users, who have access to a company's intranet portal. Operating team member can include plant managers, operational engineers, supervisors, operators, etc. The risk results can be presented using intuitive charts/dashboards in the DRA system that allow the end-users to identify hidden risks or hidden near-misses at their early stages and take strategic corrective actions to avoid adverse incidents, shutdowns, and catastrophes. Many times, the hidden risks or hidden near-misses are not patently obvious or readily available to the human eye, in spite of the operating personnel conducting daily process monitoring including shift logs review, communications with field operators, trend visualization of key process parameters, etc. The risk results calculated and communicated by the DRA system to the operating personnel present a new dimension of knowledge that not only allows the savings in time of identifying where the attention is needed, but also makes risks transparent among the entire operations staff—which is often times, not clear, nor well understood.

Dynamic Risk Fault Tree

A Dynamic Risk Fault Tree (DRFT) is an on-line, deductive analytical method and system developed to identify the causal factors of an undesired state in an industrial manufacturing process. The data and risk indicators provided by the DRA system may be one of the inputs for DRFT analysis. The other inputs may include, but not limited to, time-series data for process variables that are part of the industrial manufacturing process under consideration. A key benefit of DRFT analysis is that the results are available to the users autonomously and periodically. Furthermore, the results of all current and past calculations associated with dynamic risk fault trees are available for review at any time (without any limitation of the number of concurrent users). DRFT is not a standard FTA nor it is similar to other 'dynamic fault tree analysis' which is either based on probabilistic calculations, such as Monte Carlo analysis or simulation results. "Standard fault trees" used regularly in industrial settings are typically static in nature and often conducted for one-time use. DRFT, instead, not only points out the status of the problem based on actual measured time-series results but also the trajectory of its development over time, by conducting fault tree calculations periodically and autonomously using real-time live or periodic data. Furthermore, its capability can be enhanced by reference of DRA results and calculations in its analysis.

The DRFT system obtains input data via a DRFT Data Acquisition component. Clients use a DRFT Editor to build new DRFTs and modify existing ones. Results are displayed on a DRFT dashboard, which is a visual, user-friendly dashboard that presents the results of a specific DRFT. Furthermore, access to past information for a set of DRFTs may be displayed on a dashboard known as DRFT Overview.

With regard to the DRFT data acquisition component, DRFT can be an integral part of the DRA software system or another risk analysis system or process data analysis system. The DRA system assesses the process risk levels of an operations site, e.g. a manufacturing, production or processing facility, on a periodic basis (e.g., daily) and points to hidden near-misses (as defined in the parent patent). DRA is designed to cater to the needs of plant managers, engineers and other operating personnel, who review risk status on a periodic basis and take strategic actions as needed.

DRFT utilizes the "process data" the DRA or another risk analysis system or process data analysis system receives from an Open Platform Communications (OPC) server or Historian at scheduled intervals (every second/minute/hour or other) and processes to identify risk status as well as the potential causal factors and root causes. OPC refers to interoperability standard for reliable and secure exchange of data, between industrial hardware devices in the automation industry, developed by third-party vendors and solution providers. The data from an OPC server can be stored in an archival server, for storage and online/offline analyses. This archival server serves as a Historian. Historian systems have the capability to store large volumes of data, anywhere from a few hundred data points per second to hundreds of thousands of data points per second. In addition, the Historians permit the end-users to browse and retrieve the historical data for several years.

DRFT presents the results in a tree format and is made up of several "nodes", each consisting an expression or criterion to be satisfied (based on the state functions used in the node). The first node is referred as a "Main node" and it states the overall purpose of the fault tree. For example, identification of potential causal factors when the product yield becomes less than 95%. Other nodes, called "child nodes", stem from the main node (and other nodes) and are related to the main node through various branches. The purpose of DRFT calculations is to process the nodes and identify time periods when the expressions specified for each node is satisfied.

Nodes contain one or more of valid expressions, such as the ones listed, but not limited to, in Table 1. A valid expression typically is a Boolean expression which references process variables, numbers, and other nodes. Nodes are connected to each other via parent-child relationship.

Process variables such as temperature, pressure, etc., can be used in expressions to identify the status of a problem. These process variable values or any combination of them, as well as the results of DRA risk calculations, and any combination of them, can be used as state functions in node expressions.

Each Node can also include additional text information, such as an explanation(s) and/or recommendation(s) related to the conditions identified in that node or in other nodes.

Each fault tree can have anywhere from one to thousands of nodes with a typical fault tree consisting of somewhere between 20-200 nodes.

Although DRFT is complimentary to a DRA system, the DRFT method and system described herein can be expanded as a stand-alone method and system which can receive time series data from any automatic data collection system and obtain results using the criteria listed in the nodes.

DRFTs can be developed with a user interface. The interface may permit the user to name the node (e.g., high reactor temperature), provide an expression within the node that may be either true or false (e.g., the reactor temperature is greater than 100° C.), or provide operator recommendations such as instructions to add coolant to reduce the reactor temperature. Once more than one node is created, the user may designate parent and child relationships between the nodes.

Node expression could include, but not be limited to, the following in Table 1:

TABLE 1

Examples of node expressions and associated remarks

| Expression | Remarks |
| --- | --- |
| TI100.PV > 100 | Indicate when this temperature variable exceeds 100 |
| (TI100.PV > 100) AND | Indicate when both the |

TABLE 1-continued

Examples of node expressions and associated remarks

| Expression | Remarks |
| --- | --- |
| (TI200.PV > 100) | temperature variables exceed 100 |
| (TI100.PV > 100) OR | Indicate when either of the |
| (TI200.PV > 100) | temperature variables exceed 100 |
| DRA(TI100.PV) > 0 | Indicate when risk metric in DRA for this temperature exceeds 0 |

Each DRFT stems from a main event for which the potential root causes are expressed as nodes as "leaves" of branches. This main event is expressed using a "main node". Once the development of a DRFT is completed, it starts evaluation of node expressions periodically, which can range from every few minutes to few hours and even few days. The results of the calculations indicate when the expressions listed in its nodes are satisfied by changing the shape or the color of a node. For example, the nodes for which the expressions are true may be depicted in blue color with a bold font. This is called an "Active Fault Tree" indicating its full functionality which can be seen following its branches, as part of a new dashboard.

A full DRFT system can have multiple DRFTs associated with it. The nodes of DRFTs can be satisfied one or more times in a given time period such as a day, a week, a month, etc. A summary of the number of times when a given DRFT's main node condition is satisfied can be shown as a graphical table indicating the number of activations of its main node for each time period. Each DRFT can be updated and recomputed by the user any time—giving significant flexibility and power to them to conduct an online and automated root cause analysis.

In certain embodiments a node expression is essentially a time-series Boolean value (true or 1 for some time instants and false or 0 for remaining time instants). The advantage is that a user can build complex node expressions and cross-reference different nodes easily, which is not possible in traditional fault tree structures.

For example, say for Node-A, the expression is: (TI100.PV>100) OR ((TI200.PV>200) AND (TI300.PV>200)) OR (DRA(TI100.PV)>0) OR (Node-B). TI100.PV, TI200.PV, TI300.PV are different temperature sensors and Node-B is another node, which may or may not be part of this DRFT. When the above condition is satisfied (say it is satisfied from 5-6 pm yesterday), the value of the expression becomes TRUE or 1 during that time, otherwise, it remains FALSE or 0. Another node is referenced also—so when Node-B is true, Node-A will be also true. Within an expression, each condition is treated equally. Furthermore, in alternate embodiments, the nodes may be assigned priority. Also, a user can refer multiple operations (OR, AND, >, <, =, +, *, /, custom-DRA operations, etc.) in an expression.

Furthermore, because of the flexibility and scalability associated with the disclosed node expressions, the utility of this method extends beyond just building cause-and-effect fault trees, instead such nodes also allow the user to create "dynamic risk trees" and/or other visual tree structures where one can capture and monitor risk performance and relationships between different equipment, process areas, plant operations, etc., over time.

Dynamic Risk Sloping Trend

Dynamic Risk Sloping Trend (DRST) is an on-line, statistical method and system developed to identify slow, consistent trends or changes in any continuously measured, calculated or monitored parameter or variable in a chemical or manufacturing process. These variables can be any sensor or calculated value recorded by the process control system or historian or input manually, in relation to a chemical or manufacturing process. The main benefit of the DRST system is to detect the existence of subtle and ongoing trends in variables, which may indicate potential undesirable process issues, delivered autonomously to the users via the DRA system dashboard. DRST is different from other linear modeling and fault detection methods in that it not only detects subtle trends via linear modeling, but also applies a series of filters to measure trend quality (e.g., how closely a best-fit line tracks the linear trendline). The filter used may be a Bayesian model-based filter. One type of a Bayesian model-based filter is, for example, a Kalman or Kalman-like filter. It is noted, however, that other Bayesian model-based filters exist.

Using both current and historical data, the DRST points out the status of the problem based on actual measured time-series results along with the potential speed and likelihood with which the problem will continue to develop over time by filtering the data to not only identify trend direction but also the likelihood the trajectory at which the trend will continue. The DRST displays all this information, ordered by different classification levels, for users to view. The viewing system is built to display detected trends, overlaid on the source data, excluding shutdown periods, which are not included in analysis.

Detecting these trends can offer a vital benefit to process facilities for several reasons. First, as with the DRA system, these trends represent that maintenance may be needed in the near future, and enables the managers to plan this maintenance, rather than requiring costly unplanned maintenance. Conversely, if a maintenance is planned, the DRST system may indicate that such maintenance can be delayed, hence saving production by reducing downtime. Second, where the DRA system detects sudden spikes in the upward and downward direction, the DRST system helps fill in the gaps of slow, but steady progression towards excessively high or low values—which otherwise is not easy to identify unless someone is specifically looking for it. Finally, by providing an easy, at a glance interface, these findings are spotlighted, and can be quickly triaged by plant management and handled at the time of their choosing.

The DRST system obtains input data via a DRST Data Acquisition component. DRST is built to work alongside an existing DRA system. As mentioned above, the DRA system provides analysis at a glance of the process risk levels in a continuous operation plant. To do this, the system connects to an on-site data source (typically a historian or OPC server or sometimes an industrial control system) and extracts the data, transforms it to a uniform format, and loads it into the DRA database. This process may be referred to as an extract, transform, load ("ETL") process. This time series data shows a sensor ("variable" or "tag") and its reading at a given time (e.g. the temperature of the furnace at 1 pm is 234.5° C.). By collecting this data over long time periods, the DRST system can extract long term trends.

Figure 7A:
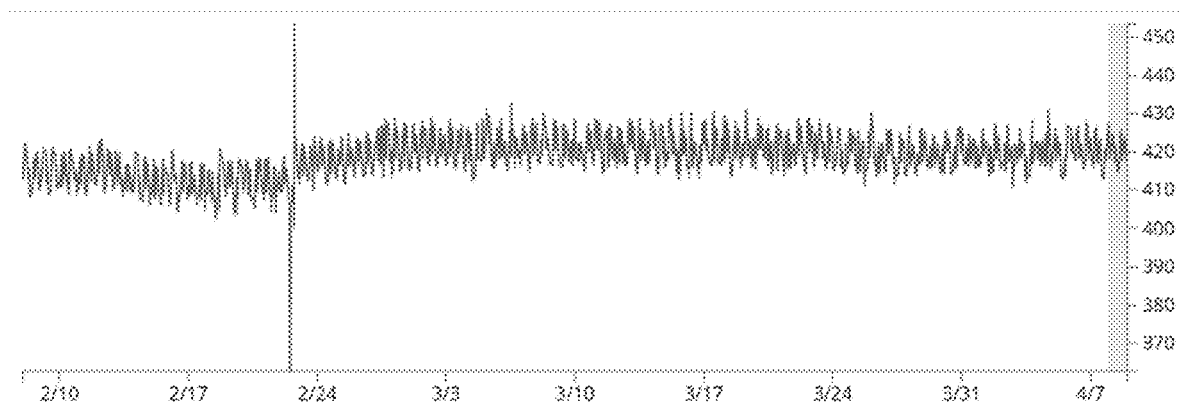
FIG. 7A shows a variable charted over 60 days.
Figure 7B:
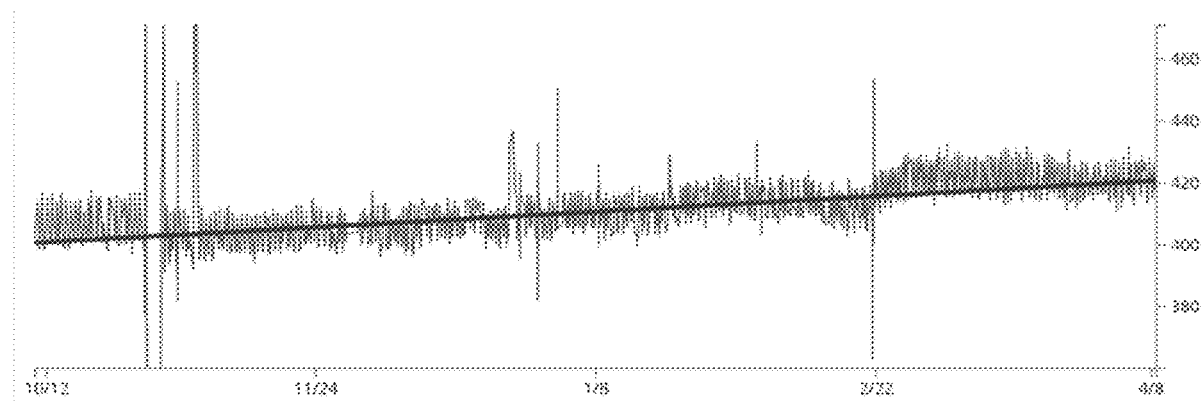
FIG. 7B shows the variable of FIG. 7A charted over 180 days along with a linear trendline identified using the dynamic risk sloping trend system.

Once the data is loaded into the DRST system, it must be analyzed. Specifically, the data collected and loaded into the DRST system is used to detect the presence of trends over an extended period. Broadly speaking, this system identifies periods of time in which a tag exhibits consistent linear behavior in an upward or downward direction. Often, this can indicate a latent and ongoing issue in a continuous processing plant, such as a leakage, or a buildup. These trends are frequently hidden and are especially difficult to detect based on spot checks by plant operators and managers. Such issues are often missed because these readings appear to be static over short time frames, but when viewed over longer time frames are clearly trending upwards or downwards. For example, compare FIG. 7A wherein a variable viewed over 60 days appears static with FIG. 7B wherein the same variable viewed over 180 days shows a subtle upward trend. Simply put, the DRST system detects trends which span several different time ranges, using several measures of fit quality, and marks these trends for display through the DRA system.

The DRST system uses an algorithm based on statistical analysis of long term trends to detect when this is occurring and calls attention to it using the DRA system. These trends are evaluated using several statistical measures including quality of fit, residual error, and a steepness and flatness measure. This ensures that the presented trends represent a latent phenomenon with a high probability.

A trend can also be associated with a strength, which indicates its quality of fit. The strength value can be measured: (a) numerically (e.g. a value is assigned out of maximum 10 or 100 points), or (b) qualitatively (e.g. a level is assigned based on pre-defined strong, medium, low, insignificant brackets). The DRA may prioritize the display of trends with higher strength. Importantly, as new data becomes available periodically (every few minutes, hourly, daily, weekly, monthly), the trends are evaluated periodically by the DRST system. If an existing trend grows over time, its strength is re-evaluated periodically.

Furthermore, most continuous processing facilities go through downtimes, typically known as shutdowns, which can be planned or unplanned. During these periods, the plants might perform troubleshooting, or other maintenance tasks, which may generate irrelevant data. The DRA system allows admins to input shutdown conditions, which automatically determine if a plant is in shutdown during that time. DRST in turn removes these shutdown periods from the analysis, as well as visually, and prevents times of disuse from causing analysis to miss trends which were present both before and after a shutdown period.

Finally, the results of the DRST system are displayed via a DRST visualizer. The DRST visualizer is a part of the DRA frontend which allows the user to view at a glance all of the variables, currently exhibiting trends, classified according to their length or strength. If classified based on length, the buckets can be long-term, medium-term and short-term trends. The minimum trend lengths for short-term, medium-term and long-term trends are 60 days, 90 days and 180 days, however, they can vary depending upon the process and can be anywhere from 15 days (short-term) to 3 years (long-term). Furthermore, the DRA may include a graphical user interface for quickly seeing which tags are undergoing a trend and whether that trend is classified as short, medium, or long term. Indeed, the DRA may include a "Show Trend" button which displays the trends In the DRST visualizer, the trends are often color coded, for example, long term trends may be highlighted in red, medium term trends may be highlighted in orange, and short-term trends may be highlighted in yellow. The DRST Visualizer allows the user to view trends over different time periods such as 60 days, 180 days, 1 year, 2 years, all data, etc. During these views, the shutdown periods are removed automatically so the user can visualize and understand the trends clearly. Optionally, the DRST can also display any anomalies detected by the DRA system.

The methods and processes described in the disclosure of the invention can be embodied as code and/or data, which can be stored in the computer-readable storage medium as described above. When a computer system reads and executes the code and/or data stored on the computer-readable storage medium, the computer system performs the methods and processes embodied as data structures and code and stored within the computer-readable storage medium.

While the invention is described in conjunction with specific embodiments, many alternatives, modifications, permutations and variations will become apparent to those skilled in the art in light of the foregoing description. Accordingly, it is intended that the invention embraces all such alternatives, modifications, permutations and variations as falling within the scope of the claims below.

We claim:

1. A dynamic system for analyzing risk levels for a manufacturing operation comprising:
    a server that receives automatically measured process data from a real-time data source and/or a historical archive data source and long-term process data for a period preceding the measured process data;
    a processor that analyzes values of parameters P and/or groups G of the parameters P of the measured process data at time interval T and compares the measured process data to the long-term process data to determine the location of a best fit line of the measured process data and the long term process data, wherein the best fit line is automatically updated over time to identify operational risk and/or near-miss risk that would otherwise be unknown or concealed in parameters P; and
    a display that presents the operational risk and/or near-miss risk in a graphic that visually depicts the long term process data and the measured process data within a specified time period along with the best fit line over top of the measured process data and the long term process data;
    wherein the system continuously and autonomously operates contemporaneously with the manufacturing operation.

2. The system of claim 1, wherein the best fit line is determined by using a Bayesian model-based filter which accounts for the measured process data and the long-term process data.

3. The system of claim 2, wherein the Bayesian model-based filter is a Kalman filter.

4. The system of claim 1, wherein the best fit line is linear.

5. The system of claim 1, wherein the process data is either an analog signal or a two-state signal.

6. The system of claim 1, wherein the process data is not communicated outside the manufacturing operation.

7. The system of claim 1, wherein the system operates autonomously.

8. The system of claim 1, wherein the system operates perpetually without an operator.

9. A method for dynamic prediction of risk levels in a manufacturing operation comprising:
    collecting: (1) measured process data, comprising: data automatically collected by a data collection component, located within the manufacturing operation, in either (a) real-time or (b) from an archive server or both; and (2) long-term process data for a period preceding the collecting measured data;
    identifying risk and/or near-miss risk of the manufacturing operation that would otherwise be unknown or concealed in parameters P and/or groups (of the parameters P of process data, the process data by comparing the measured process data to the long-term process data to determine the location of a best fit line of the measured process data and the long term process data, wherein the best fit line is automatically updated over time to identify operational risk and/or near-miss risk that would otherwise be unknown or concealed in parameters P; and
    displaying the risk or near-miss risk in a graphic that visually depicts the long-term process data and the measured process data within a specified time period along with the best fit line over top of the measured process data and the long term process data;
    wherein the method is performed continuously and autonomously.

10. The method of claim 9, wherein the best fit line is determined by using a Bayesian model-based filter which accounts for the measured process data and the long-term process data.

11. The method of claim 10, wherein the Bayesian model-based filter is a Kalman filter.

12. The method of claim 9, wherein the best fit line is linear.

13. A display system for risk indicators for a manufacturing operation comprising:
    identifying risk and/or near-miss risk of the manufacturing operation that would otherwise be unknown or concealed in parameters P and/or groups G of the parameters P of measured process data, in real-time, periodically, and/or historically wherein the measured process data is obtained by using a data collection component located within the manufacturing operation;
    comparing the measured process data to long-term process data to determine the location of a best fit line of the measured process data and the long term process data, wherein the best fit line is automatically updated over time to identify operational risk and/or near-miss risk that would otherwise be unknown or concealed in parameters P; and
    displaying the risk or near-miss risk in a graphic that visually depicts the long-term process data and the measured process data within a specified time period along with the best fit line over top of the measured process data and the long term process data.

* * * * *